US012812518B2

(12) United States Patent
Bhaskaran

(10) Patent No.: US 12,812,518 B2
(45) Date of Patent: Nov. 24, 2026

(54) CLOUD NATIVE SCALABLE RADIO ACCESS NETWORKS

(71) Applicant: Rakuten Symphony, Inc., Tokyo (JP)

(72) Inventor: Sridhar Bhaskaran, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 623 days.

(21) Appl. No.: 17/928,999

(22) PCT Filed: Nov. 1, 2022

(86) PCT No.: PCT/US2022/079059
§ 371 (c)(1),
(2) Date: Dec. 1, 2022

(87) PCT Pub. No.: WO2024/096903
PCT Pub. Date: May 10, 2024

(65) Prior Publication Data
US 2024/0251338 A1 Jul. 25, 2024

(51) Int. Cl.
*H04W 40/22* (2009.01)
*H04W 48/00* (2009.01)
*H04W 76/18* (2018.01)

(52) U.S. Cl.
CPC ........... *H04W 48/17* (2013.01); *H04W 76/18* (2018.02)

(58) Field of Classification Search
None
See application file for complete search history.

(56) References Cited

U.S. PATENT DOCUMENTS

2016/0337185 A1* 11/2016 Hardison ................ H04W 4/80
2018/0115928 A1 4/2018 Kim et al.
2019/0007500 A1 1/2019 Kim et al.
2020/0314701 A1 10/2020 Talebi Fard et al.
2024/0214900 A1* 6/2024 Chang ................... H04W 40/22

FOREIGN PATENT DOCUMENTS

EP 2079250 B1 4/2013
WO 2022/077199 A1 4/2022

OTHER PUBLICATIONS

International Search Report and Written Opinion for International Patent Application No. PCT/US22/79059 mailed Feb. 7, 2023.
3GPP TS 23.501, "3rd Generation Partnership Project; Technical Specification Group Services and Systems Aspects; System architecture for the 5G System (5GS); Stage 2 (Release 17)," Jun. 2022.

(Continued)

*Primary Examiner* — Anez C Ebrahim
(74) *Attorney, Agent, or Firm* — Sughrue Mion, PLLC

(57) ABSTRACT

In general, the current subject matter relates to cloud native scalable radio access networks. In some implementations, a user equipment (UE) context can be established for a UE attempting to connect to a wireless communication system including a radio access network (RAN) that is communicatively coupled to a core network. The UE context can be decoupled from a transport layer connection specified in the UE context.

18 Claims, 16 Drawing Sheets

(56) References Cited

OTHER PUBLICATIONS

3GPP TS 37.482, "3rd Generation Partnership Project; Technical Specification Group Radio Access Network; E1 signalling transport (Release 17)," Jun. 2022.
3GPP TS 37.482, "3rd Generation Partnership Project; Technical Specification Group Radio Access Network; NG-RAN; F1 signalling transport (Release 17)," Apr. 2022.
3GPP TS 38.401, "3rd Generation Partnership Project; Technical Specification Group Radio Access Network; NG-RAN; Architecture description (Release 17)," Sep. 2022.
3GPP TS 38.412, "3rd Generation Partnership Project; Technical Specification Group Radio Access Network; NG-RAN; NG signalling transport (Release 17)," Apr. 2022.
David Soldani, "6G Fundamentals: Vision and Enabling Technologies," 6G World, Jun. 15, 2021, pp. 1-18, available at <https://www.6gworld.com/latest-research/6g-fundamentals-vision-and-enabling-technologies/>.
David Soldani, "6G Fundamentals: Vision and Enabling Technologies," Jun. 16, 2021, available at <https://www.linkedin.com/pulse/6g-fundamentals-vision-enabling-technologies-dr-david-soldani>.
NGMN Alliance, "6G Drivers and Vision," v1.0, Apr. 19, 2021, pp. 1-13.
Volker Ziegler et al., "6G Architecture to Connect the Worlds," IEEE Access, vol. 8, pp. 173508-173520, 2020.
Huawei, "BL CR to 38.463: Support for IAB", 3GPP TSG-RAN WG3 meeting #108-e, Online, Jun. 1-11, 2020, R3-203003, 20 pages total.

* cited by examiner

CLOUD NATIVE SCALABLE RADIO ACCESS NETWORKS

CROSS-REFERENCE TO RELATED APPLICATIONS

The present application claims priority to and is the 35 U.S.C. 371 United States National Phase application based on International Patent Application No. PCT/US22/79059, filed on Nov. 1, 2022, entitled "CLOUD NATIVE SCALABLE RADIO ACCESS NETWORKS," which is hereby incorporated by reference in its entirety.

TECHNICAL FIELD

In some implementations, the current subject matter relates to telecommunications systems, and in particular, to cloud native scalable radio access networks (RANs).

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile: in rural areas, the range can be as much as 5 miles: and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer, and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

Next generation RAN (NG-RAN) is defined by the 3GPP standards body as a radio access network capable of connecting to the 5G core network. NG-RAN includes the following radio access networks: new radio (NR) and evolved universal terrestrial radio access network (EU-TRAN). 5G technology was established by the 3GPP standards body with only the core network being suitable for cloud native deployment. NG-RAN as defined currently is not suitable for cloud native development as there is hard binding between a UE context and the corresponding transport connection used towards the core network. Instead, disaggregation was the focus for RAN and has been further developed by the O-RAN Alliance. Benefits of cloud native deployment, such as stateless horizontal scalability and resiliency against transport connection failure, may therefore not be fully achievable in RAN in 5G systems.

SUMMARY

In some implementations, the current subject matter relates to a computer-implemented method. The method can include establishing a user equipment (UE) context for a UE attempting to connect to a wireless communication system including a radio access network (RAN) that is communicatively coupled to a core network. The UE context can be decoupled from a transport layer connection specified in the UE context.

In some implementations, the current subject matter can include one or more of the following optional features.

In some implementations, the RAN can be configured to address the UE context through any of a plurality of available transport layer connections. Further, the RAN can be configured to select one of the plurality of available transport layer connections for addressing the decoupled UE context. Further, the RAN can be configured to randomly select the one of the plurality of available transport layer connections, the RAN can be configured to select, based on a load balancing of the plurality of available transport layer connections, the one of the plurality of available transport layer connections, or the RAN can be configured to select, based on a predetermined selection order of the plurality of available transport layer connections, the one of the plurality of available transport layer connections.

In some implementations, a failure of the transport layer connection can not release the UE context. Further, a re-establishment of the failed transport connection can be treated independent of the UE context.

In some implementations, the RAN can be configured to look up the UE context basely solely on an application layer context identifier.

In some implementations, the method can further include, after establishing the UE context, communicating between the RAN and the core network.

In some implementations, the method can further include, after establishing the UE context, communicating between a distributed unit (DU) of the RAN and at least one of a control plane portion of a centralized unit (CU) of the RAN and a user plane portion of the CU using a RAN-selected available one of a plurality of available transport layer connections between the DU and the at least one of the control plane portion and the user plane portion.

In some implementations, the method can further include, after establishing the UE context, communicating between a control plane portion of a centralized unit (CU) of the RAN and a user plane portion of the CU using a RAN-selected available one of a plurality of available transport layer connections between the control plane portion and the user plane portion.

In some implementations, the RAN can use a protocol for transport layer communication for a control plane that includes one of the following: stream control transmission protocol (SCTP), transmission control protocol (TCP), and QUIC.

In some implementations, the RAN can use a protocol for transport layer communication for a user plane that includes user datagram protocol (UDP).

In some implementations, the RAN can include a base station that is communicatively coupled to the core network.

In some implementations, the core network can establish the UE context.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1A:
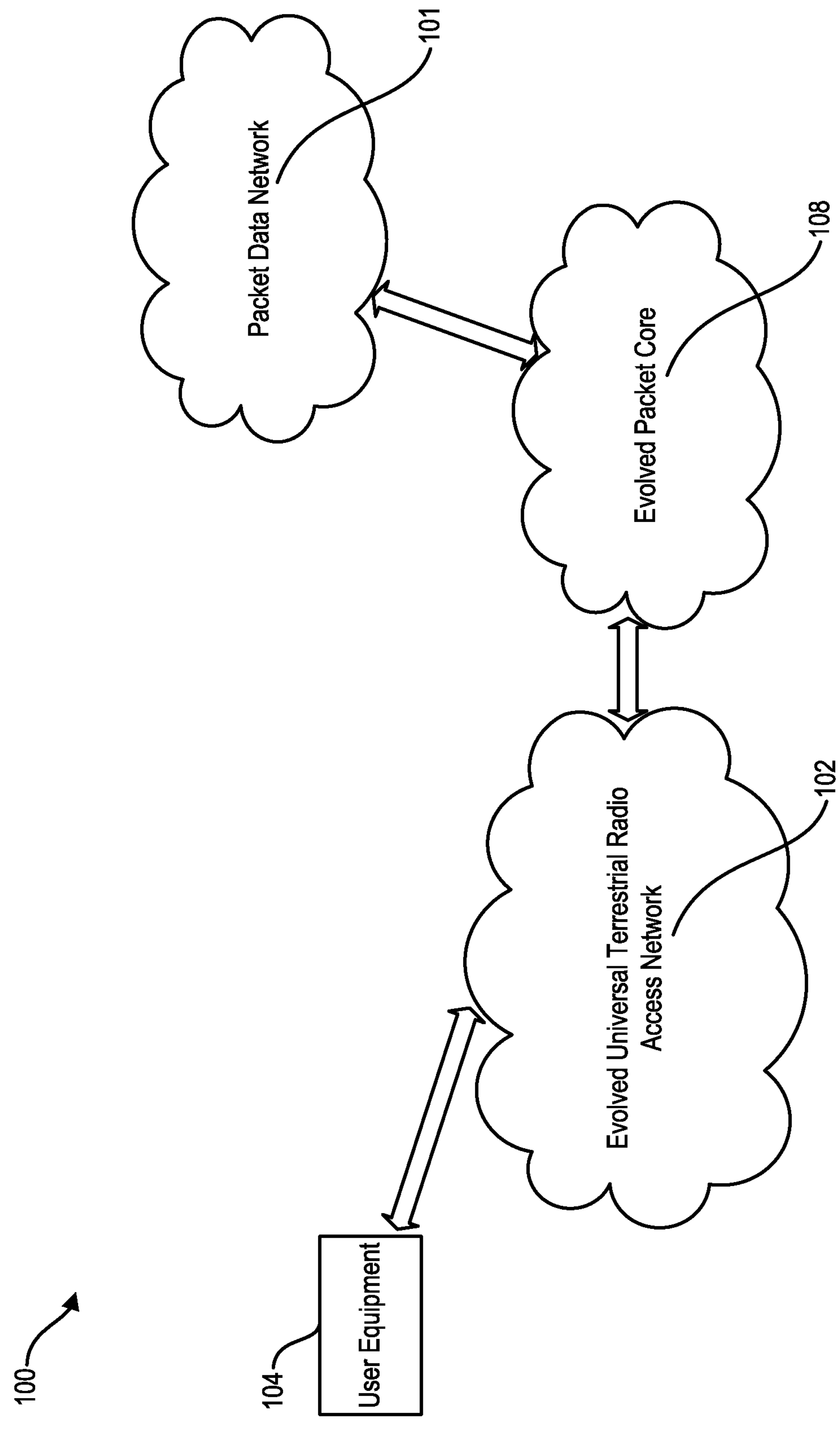
FIG. 1*a* illustrates an exemplary conventional long term evolution ("LTE") communications system.

The current subject matter can provide for systems and methods that can be implemented in wireless communications systems.

In general, the current subject matter relates to cloud native scalable radio access networks.

In some implementations of the current subject matter, a 3GPP cellular technology can include a radio access network (RAN) configured for cloud native deployment. RAN can be configured for cloud native development from an initial implementation of the 3GPP cellular technology, which may allow the RAN's cloud native capability to be utilized through a life of the 3GPP technology. The 3GPP cellular technology including the RAN can be a 6G standard and/or a later-developed standard, or can be an enhancement to a 5G or LTE wireless communication system. The O-RAN Alliance may also develop standards to include cloud native capability for radio access networks.

Currently, a core network implemented in accordance with the 5G standard is suitable for cloud native deployment while a RAN (e.g., NG-RAN) implemented in accordance with the 5G standard is not suitable for cloud native deployment. The core network in a 5G wireless communication system establishes a UE context for a UE attempting to establish a connection for communication, and only the core network is allowed under the 5G standard to move the UE context across available transport connections. Thus, in the event that a transport layer (TL) connection (also referred to as a "transport network layer (TNL) connection") to which the UE context is bound fails, the RAN cannot use another transport layer connection and must wait for the core network to change the UE context. The RAN in the 5G system therefore cannot use the cloud principle of keeping application context separate from transport. Delays may be thus encountered in the communication system, as well as increased use of limited bandwidth and processing resources in relation to the UE context change that must performed by the core network.

With a RAN being configured for cloud native deployment as described herein, the RAN can be configured to dynamically select any available transport layer connection for a given UE without having to wait for the core network to change the UE context for the UE. The RAN can therefore use the cloud principle of keeping application context separate from transport.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1*a-c* and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1B:
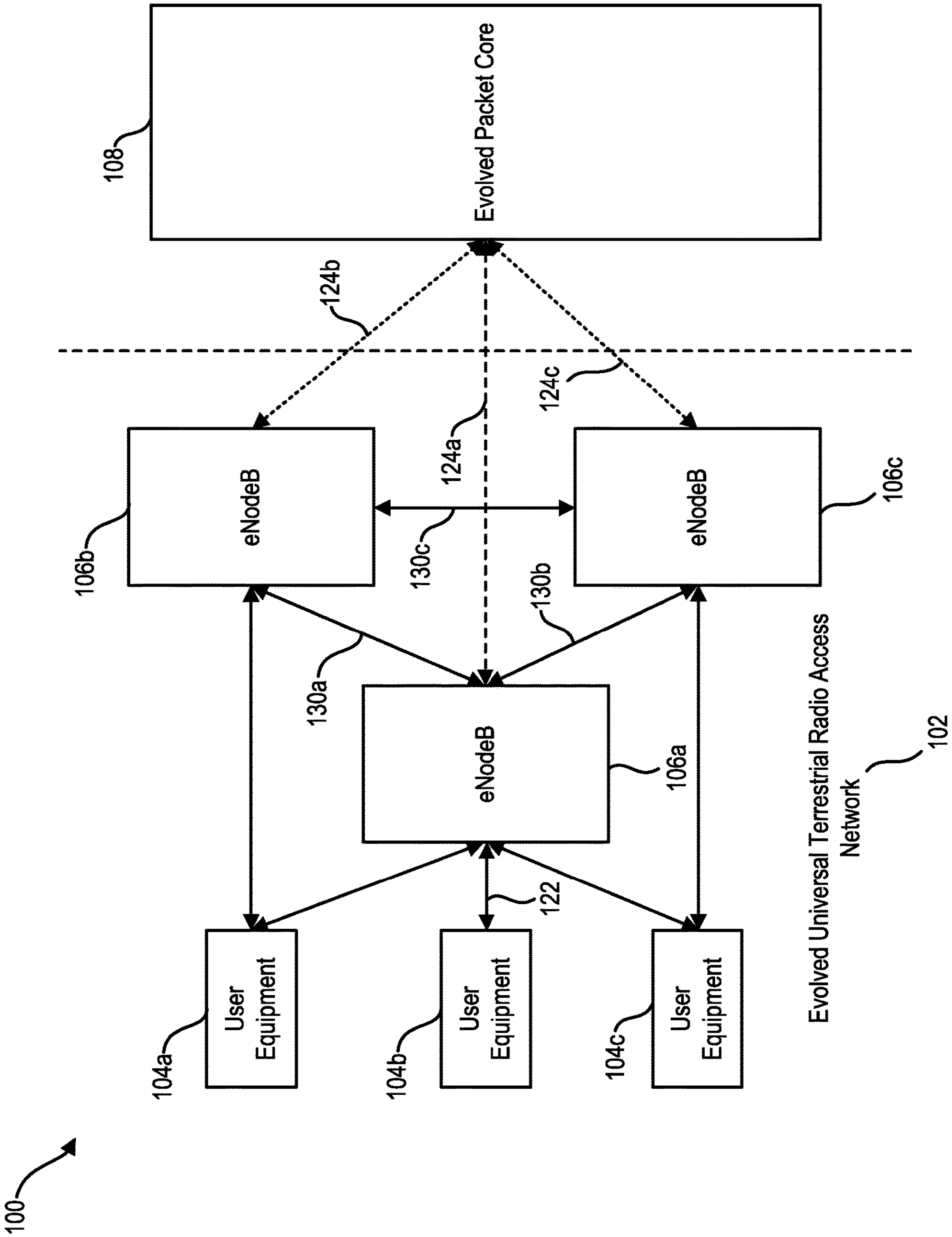
FIG. 1*b* illustrates further detail of the exemplary LTE system shown in FIG. 1*a:*

As shown in FIG. 1*a*, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (*a, b, c*) (as shown in FIG. 1*b*) that provide communication capabilities to a plurality of user equipment 104(*a, b, c*). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
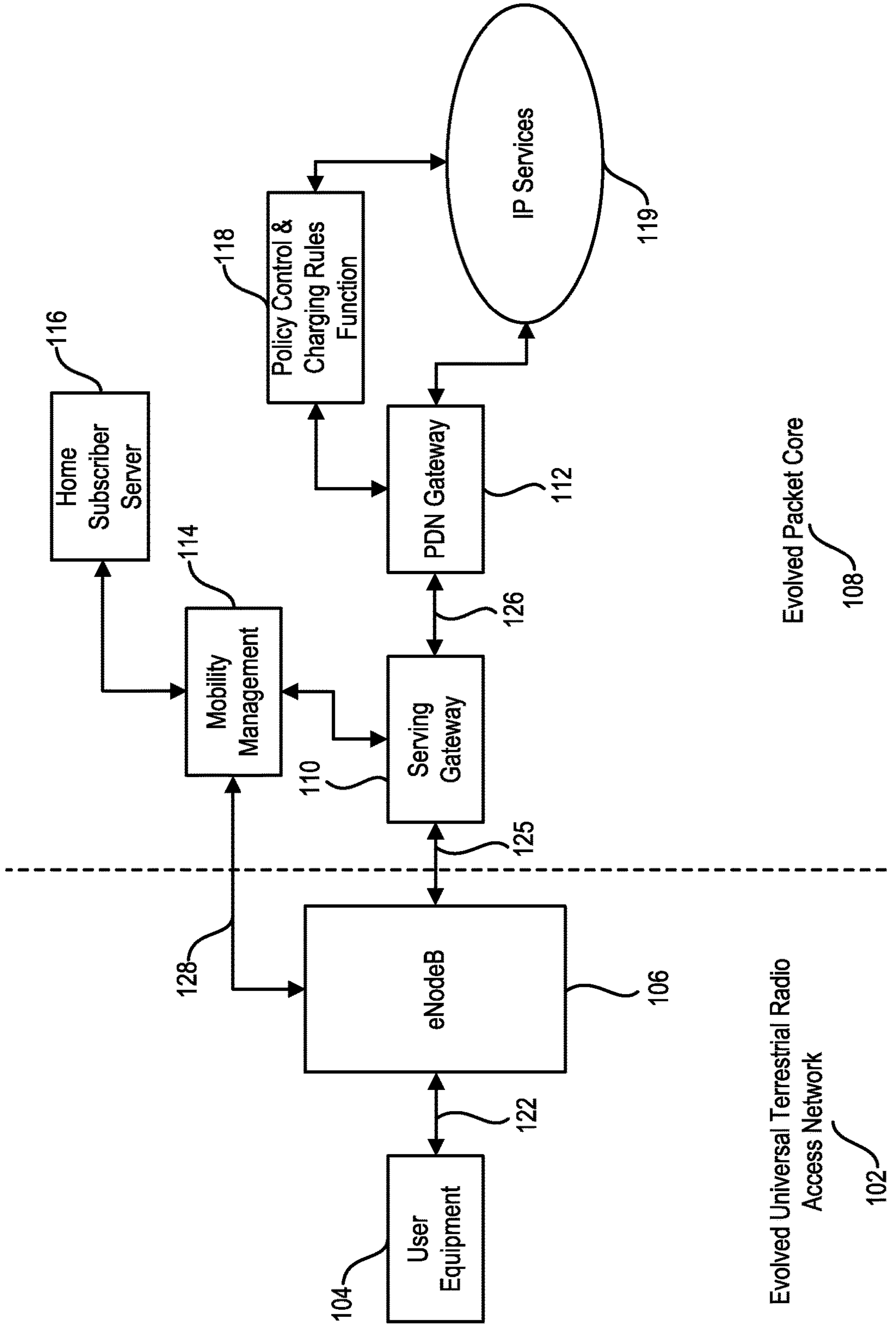
FIG. 1*c* illustrates additional detail of the evolved packet core of the exemplary LTE system shown in FIG. 1*a;*

FIG. 1*b* illustrates further detail of the network 100 shown in FIG. 1*a*. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1*c*) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1*b*, the air interface 122 provides communication between user equipment 104*b* and the eNodeB 106*a*. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1*c*). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(*a, b, c*). As shown in FIG. 1*b*, X2 interface 130*a* provides interconnection between eNodeB 106*a* and eNodeB 106*b*: X2 interface 130*b* provides interconnection between eNodeB 106*a* and eNodeB 106*c*: and X2 interface 130*c* provides interconnection between eNodeB 106*b* and eNodeB 106*c*. The X2 interface can be established between two eNodeBs in order to provide an exchange of signals, which can include a load- or interference-related information as well as handover-related information. The eNodeBs 106 communicate with the evolved packet core 108 via an S1 interface 124(*a, b, c*). The S1 interface 124 can be split into two interfaces: one for the control plane (shown as control plane interface (S1-MME interface) 128 in FIG. 1*c*) and the other for the user plane (shown as user plane interface (S1-U interface) 125 in FIG. 1*c*).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1*c*. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
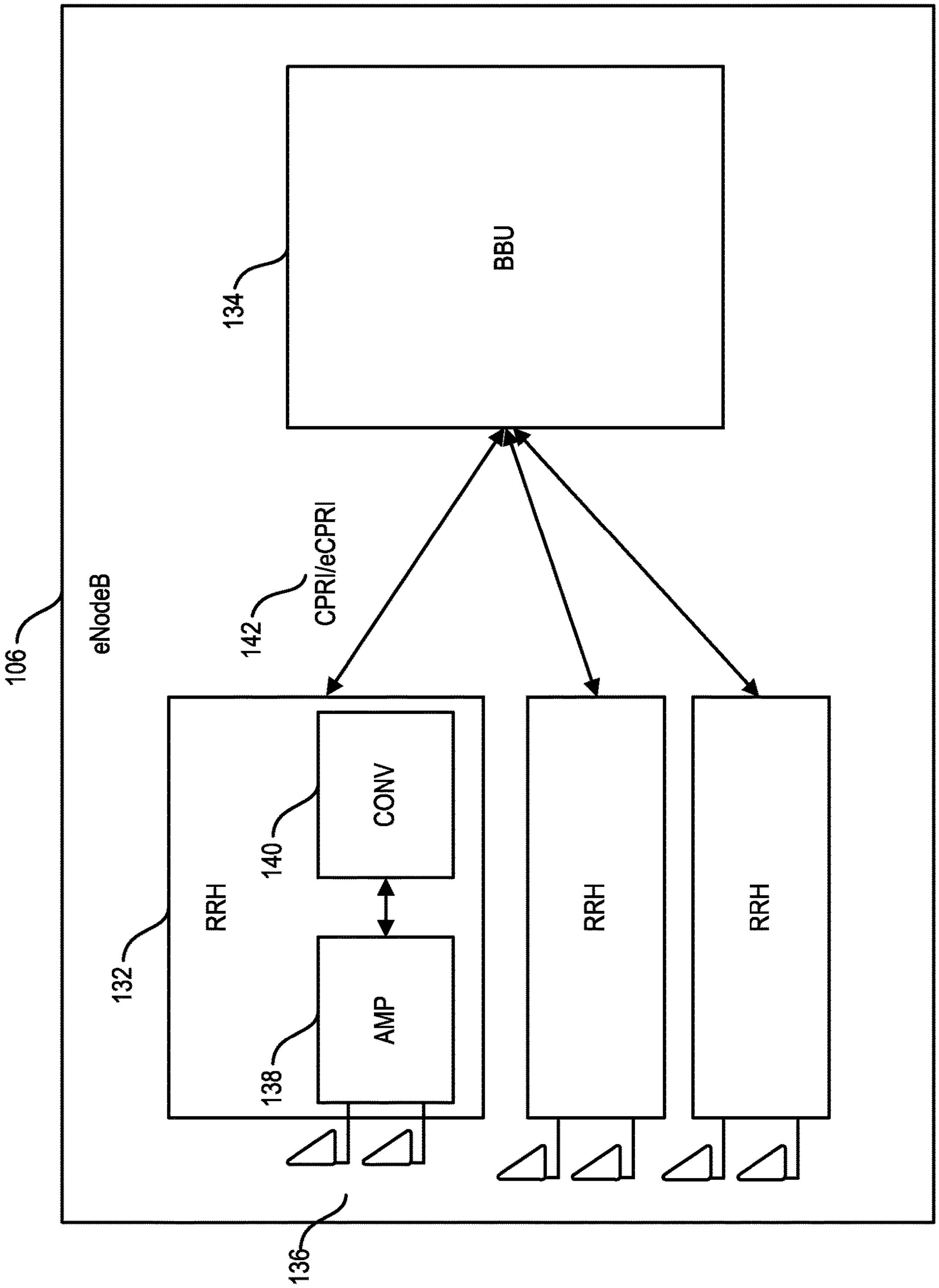
FIG. 1*d* illustrates an exemplary evolved Node B of the exemplary LTE system shown in FIG. 1*a:*

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA: uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
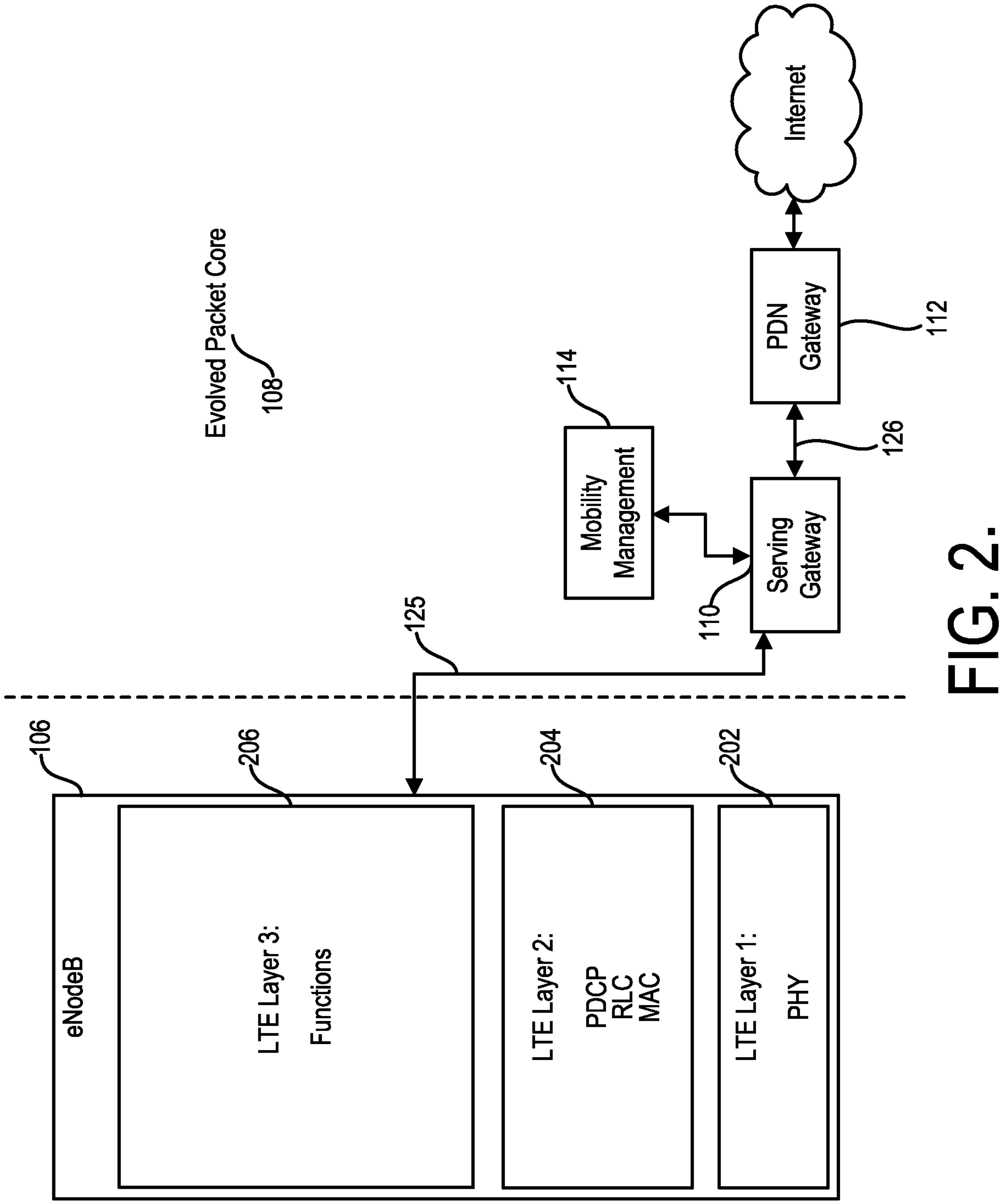
FIG. 2 illustrates further detail of an evolved Node B shown in FIGS. 1*a-d:*

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
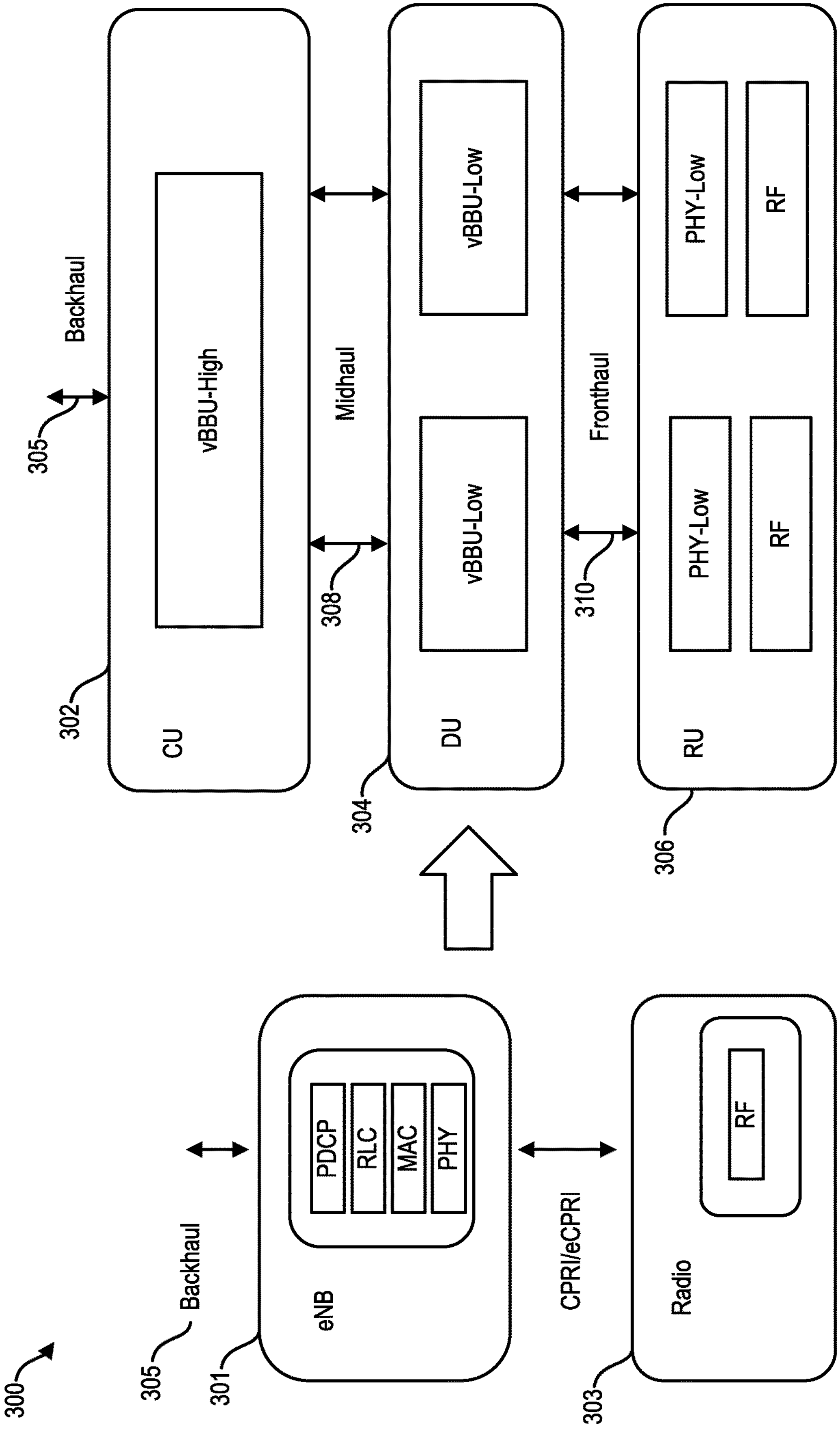
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
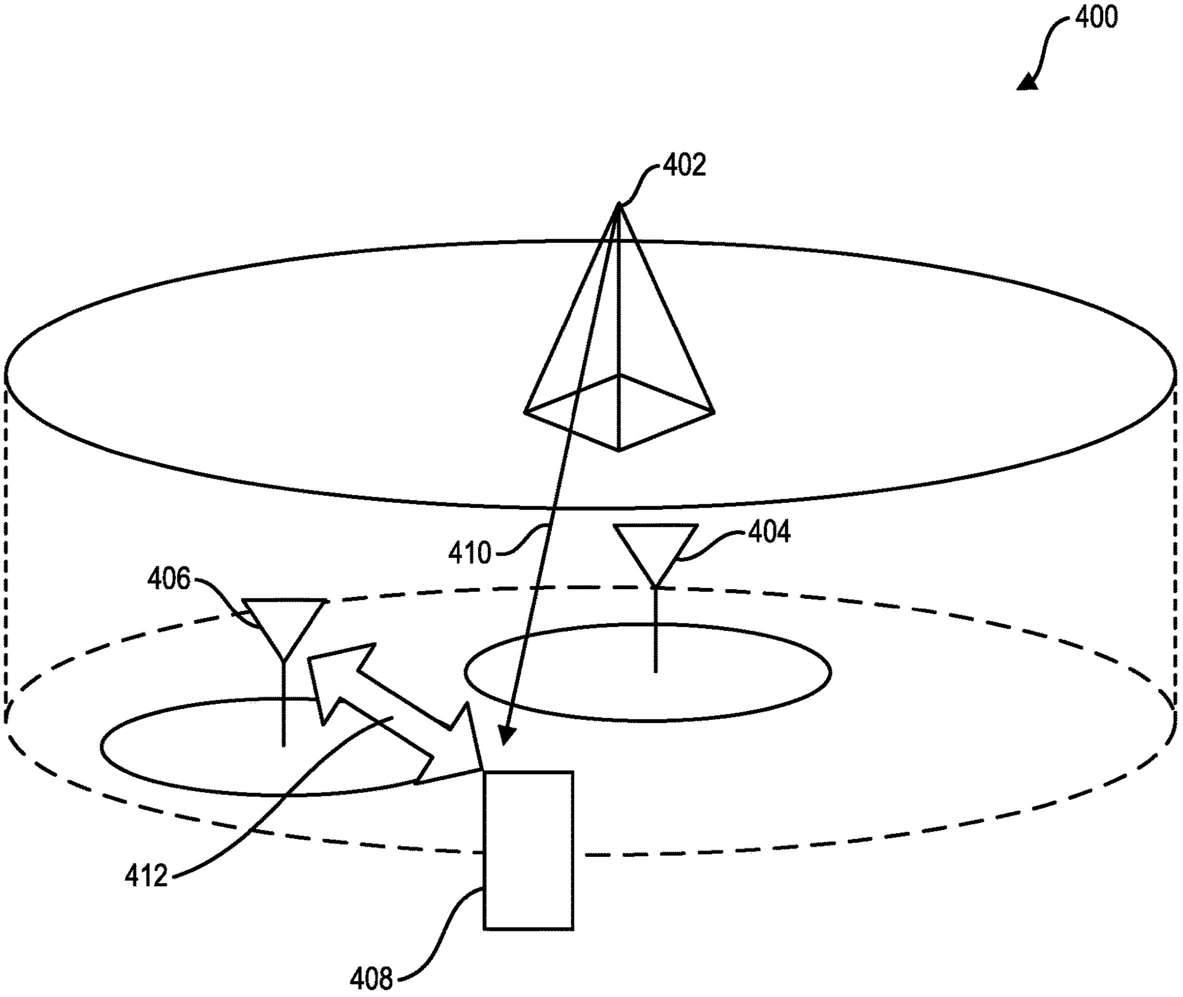
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
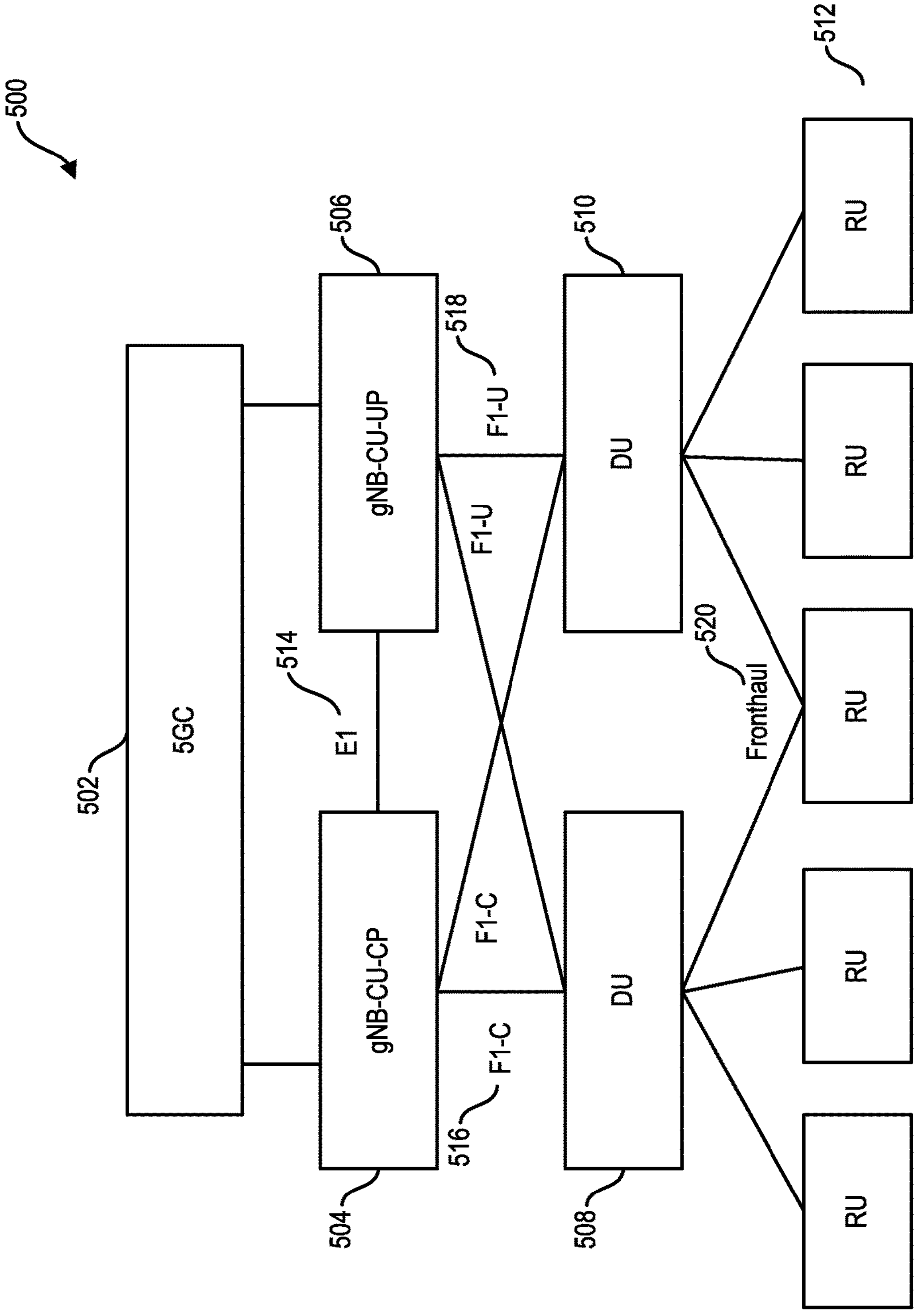
FIG. 5*a* illustrates an exemplary 5G wireless communication system.

FIG. 5*a* illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5*a*). The remote radio units 512 can be configured to execute a lower part of the PHY layer protocols as well as provide antenna capabilities to the remote units for communication with user equipments (similar to the discussion above in connection with FIGS. 1*a*-2).

Figure 5B:
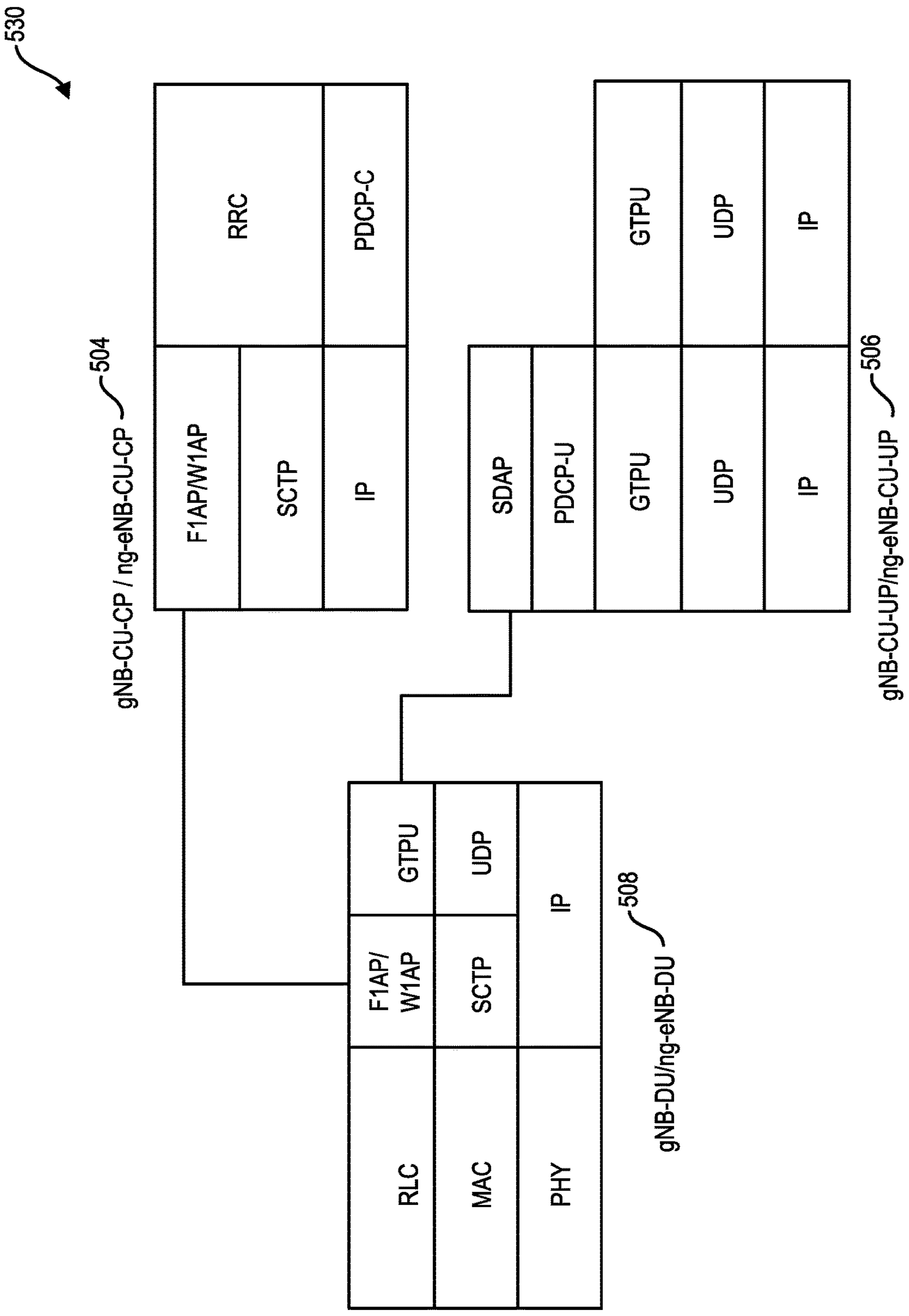
FIG. 5*b* illustrates an exemplary layer architecture of the split gNB and/or a split ng-eNB (e.g., next generation eNB that may be connected to 5GC)

FIG. 5*b* illustrates an exemplary layer architecture 530 of the split gNB. The architecture 530 can be implemented in the communications system 500 shown in FIG. 5*a*, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5*b*, the gNB-DU 508 can be communicatively coupled to the gNB-CU-CP control plane portion 504 (also shown in FIG. 5*a*) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP, and IP sublayers.

Figure 5C:
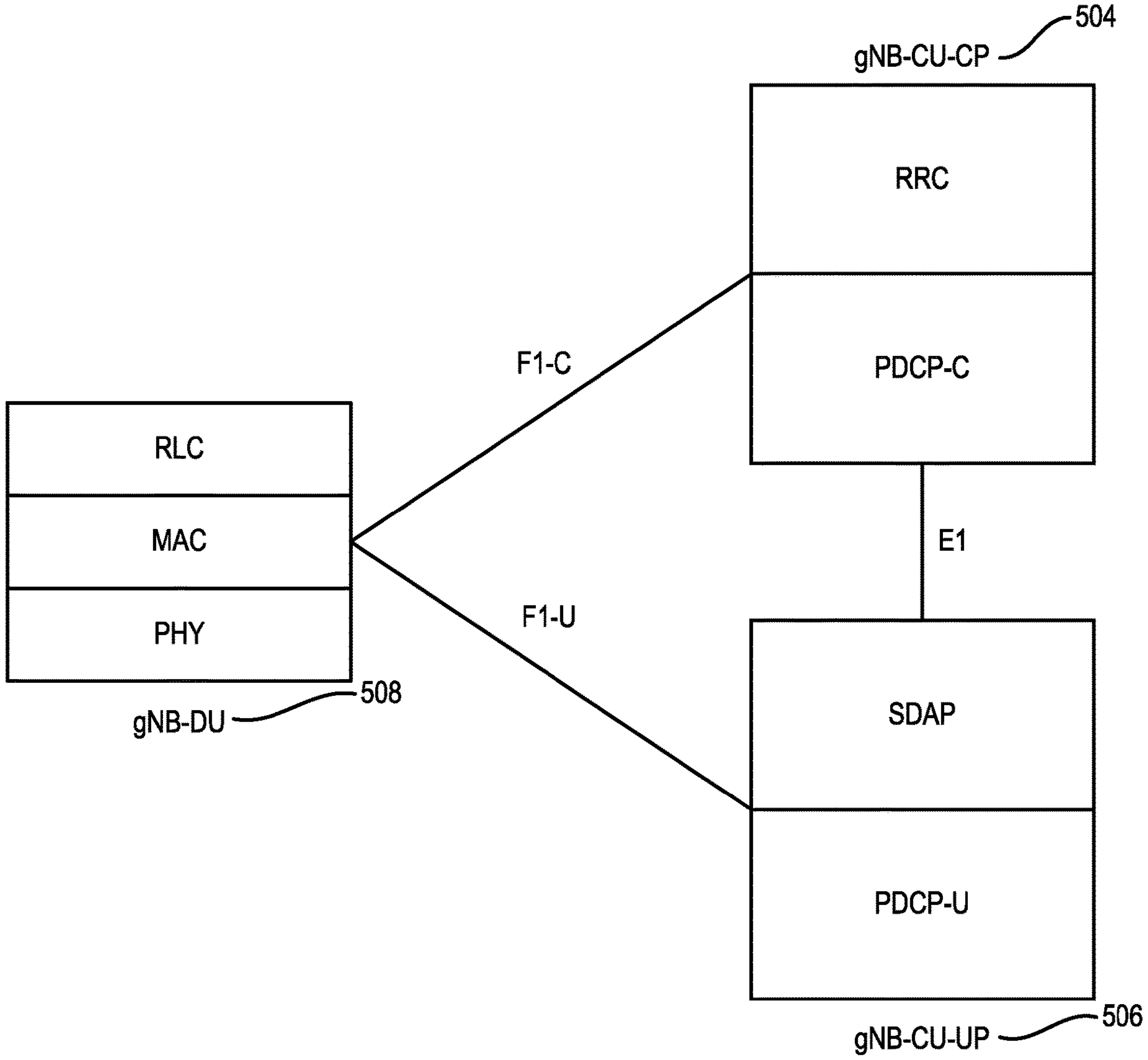
FIG. 5*c* illustrates an exemplary functional split in the gNB architecture shown in FIGS. 5*a-b;*

FIG. 5*c* illustrates an exemplary functional split in the gNB architecture shown in FIGS. 5*a-b*. As shown in FIG. 5*c*, the gNB-DU 508 may be communicatively coupled to the gNB-CU-CP 504 and gNB-CU-UP 506 using an F1-C communication interface. The gNB-CU-CP 504 and gNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5*c*). As shown in FIG. 5*c*, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Cloud Native Scalable Radio Access Networks

In some implementations of the current subject matter, a 3GPP cellular technology can include a radio access network (RAN) configured for cloud native deployment. The RAN can be configured for cloud native deployment from an initial implementation of the 3GPP cellular technology, which may allow the RAN's cloud native capability to be utilized through a life of the 3GPP technology. The 3GPP cellular technology including the RAN can be a 6G standard and/or a later-developed standard, or can be an enhancement to a 5G or LTE wireless communication system. The O-RAN Alliance may also develop standards to include cloud native capability for radio access networks.

Currently, a core network (e.g., the core network 502 of FIG. 5*a*) implemented in accordance with the 5G standard establishes a UE context for a UE attempting to establish a connection for communication, and only the core network is allowed under the 5G standard to move the UE context. Further, the 5G standard provides that a UE context is bound to a particular transport connection as such binding can minimize latency of UE context lookup and subsequent processing in the RAN, as it is easy to lookup a UE context directly from a transport layer connection and application layer identifier. Such functionality of the core network is discussed, for example, in 3GPP TS 23.501 "System architecture for the 5G System (5GS)" clauses 5.21.1.2 (NGAP UE-TNLA-binding) and 5.21.1.3 (N2 TNL association selection), 3GPP TS 37.482 "E1 signalling transport" clause 7 (Transport layer), 3GPP TS 38.412 "NG-RAN; NG signaling transport" clause 7 (Transport layer), and 3GPP TS 38.472 "NG-RAN; F1 signalling transport" clause 7 (Transport layer). The 3GPP standard defines a user equipment transport network layer association binding (UE-TNLA-binding) as a binding between the UE association and a specific TNL association for a given UE.

Also currently, a RAN implemented in accordance with the 5G standard can include a base station (e.g., gNodeB) gNB-CU logically split into one or more control plane portions gNB-CU-CP (e.g., gNB-CU-CP 504 of FIGS. 5*a*-5*c*) and one or more user plane portions gNB-CU-UP (e.g., gNB-CU-UP 506 of FIGS. 5*a*-5*c*). For the E1 communication interface (e.g., E1 communication interface 514 of FIGS. 5*a* and 5*c*) between the one or more control plane portions gNB-CU-C and the one or more user plane portions gNB-CU-UP and for the F1 communication interfaces (e.g., F1-C communication interfaces 516 and F1-U communication interfaces 518 of FIGS. 5*a* and 5*c*) between one or more DUs (e.g., DUs 508, 510 of FIGS. 5*a*-5*c*) and the control plane portion and the user plane portion, the gNB-CU can update the UE-TNLA-binding, but only uni-directionally toward gNB-DU but not toward the core network. Such functionality is discussed, for example, in 3GPP TS 38.401 "NG-RAN: Architecture description" clauses 8.8 (Multiple TNLAs for F1-C) and 8.10 (Multiple TNLAs for E1).

Thus, in the event that a transport layer connection to which the UE context is bound fails, no downstream network functions can select an available transport layer connection and rebind the UE context to the selected transport layer connection. The RAN thus cannot use another transport layer connection and must wait for the core network to change the UE context. The RAN in the 5G system therefore cannot use the cloud principle of keeping application context separate from transport. Delays may thus be encountered in the communication system, as well as increased use of limited bandwidth and processing resources in relation to the UE context change that must performed by the core network. Minimizing latency of UE context lookup and subsequent processing in the RAN may be achieved in 5G, as discussed above, but such minimization is primarily an efficiency achievable by a particular vendor's implementation rather than by the currently required standard functionality of the core network.

With a RAN being configured for cloud native deployment as described herein, the RAN can be configured to dynamically select any available transport layer connection for a given UE without having to wait for the core network to change the UE context for the UE. The RAN can therefore use the cloud principle of keeping application context separate from transport. Minimizing latency of UE context lookup and subsequent processing in the RAN may also be achieved as it is easy to lookup a UE context directly from an application layer identifier.

Figure 6A:
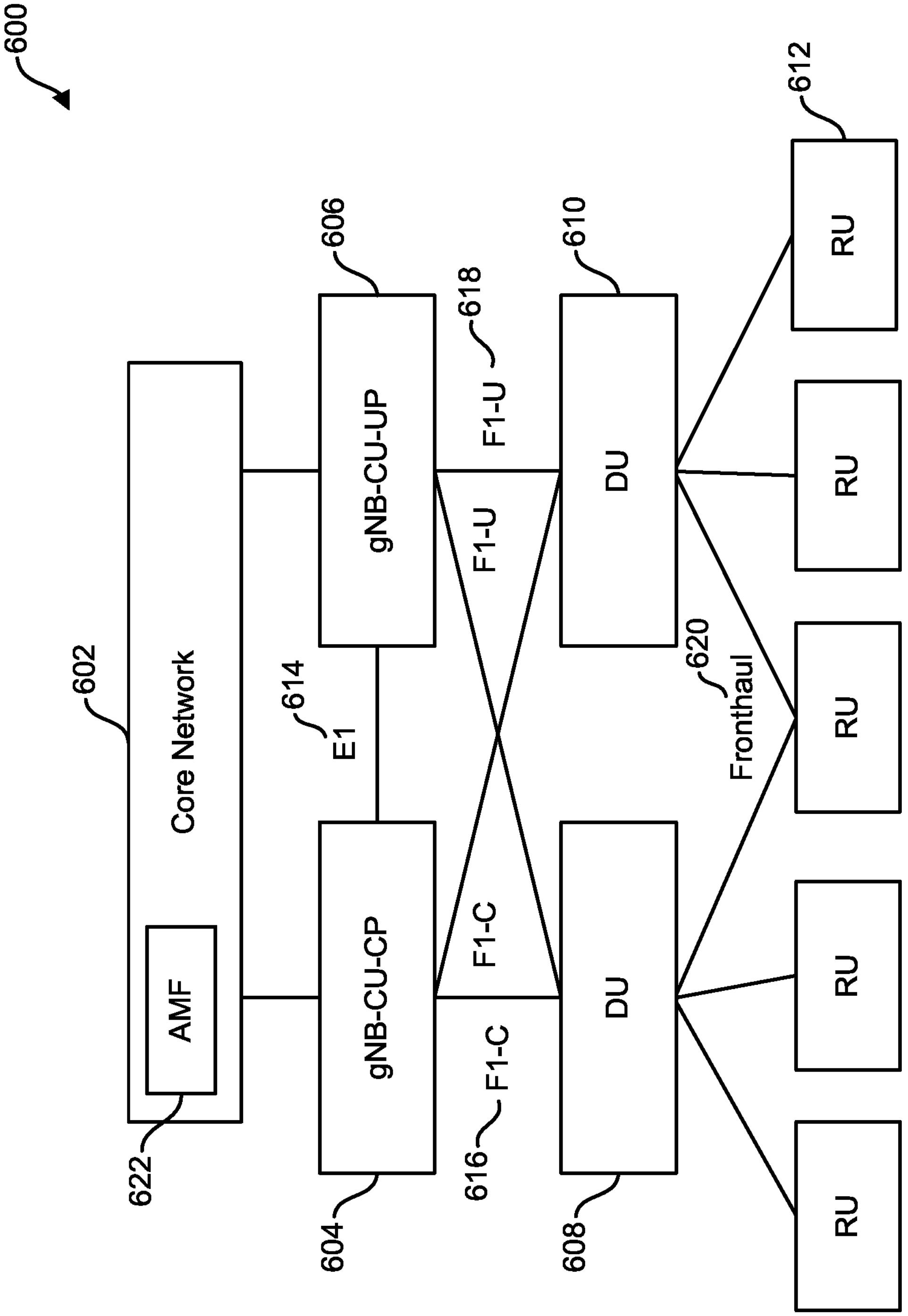
FIG. 6*a* illustrates an exemplary wireless communication system, according to some implementations of the current subject matter.

FIG. 6*a* illustrates an exemplary wireless communication system 600 including a cloud native scalable RAN, according to some implementations of the current subject matter. The wireless communication system 600 can be a 6G wireless communication system and/or a later-developed wireless communication system, or can be an LTE wireless communication system.

The system 600 of FIG. 6*a* includes elements that are configured and used similar to like-named elements in FIGS. 5*a*-5*c*, except as discussed herein regarding RAN cloud native capability. The system 600 includes a core network 602, one or more gNB-CU-CPs 604, one or more gNB-CU-UPs 606, one or more DUs 608, 610, one or more RUs 612 communicatively coupled with the DUs 608, 610 via a fronthaul network 620 (which may include one or switches, links, etc.), an E1 communication interface 614 communicatively coupling the control plane portion 604 and the user plane portion 606, F1-C communication interfaces 616 communicatively coupling the control plane portion 604 and the DUs 608, 610, and F1-U communication interfaces 618 communicatively coupling the user plane portion 606 and the DUs 608, 610. The base station gNB, e.g., the RUs 612 thereof, can be communicatively coupled with one or more UEs (not shown in FIG. 6*a*).

Figure 6B:
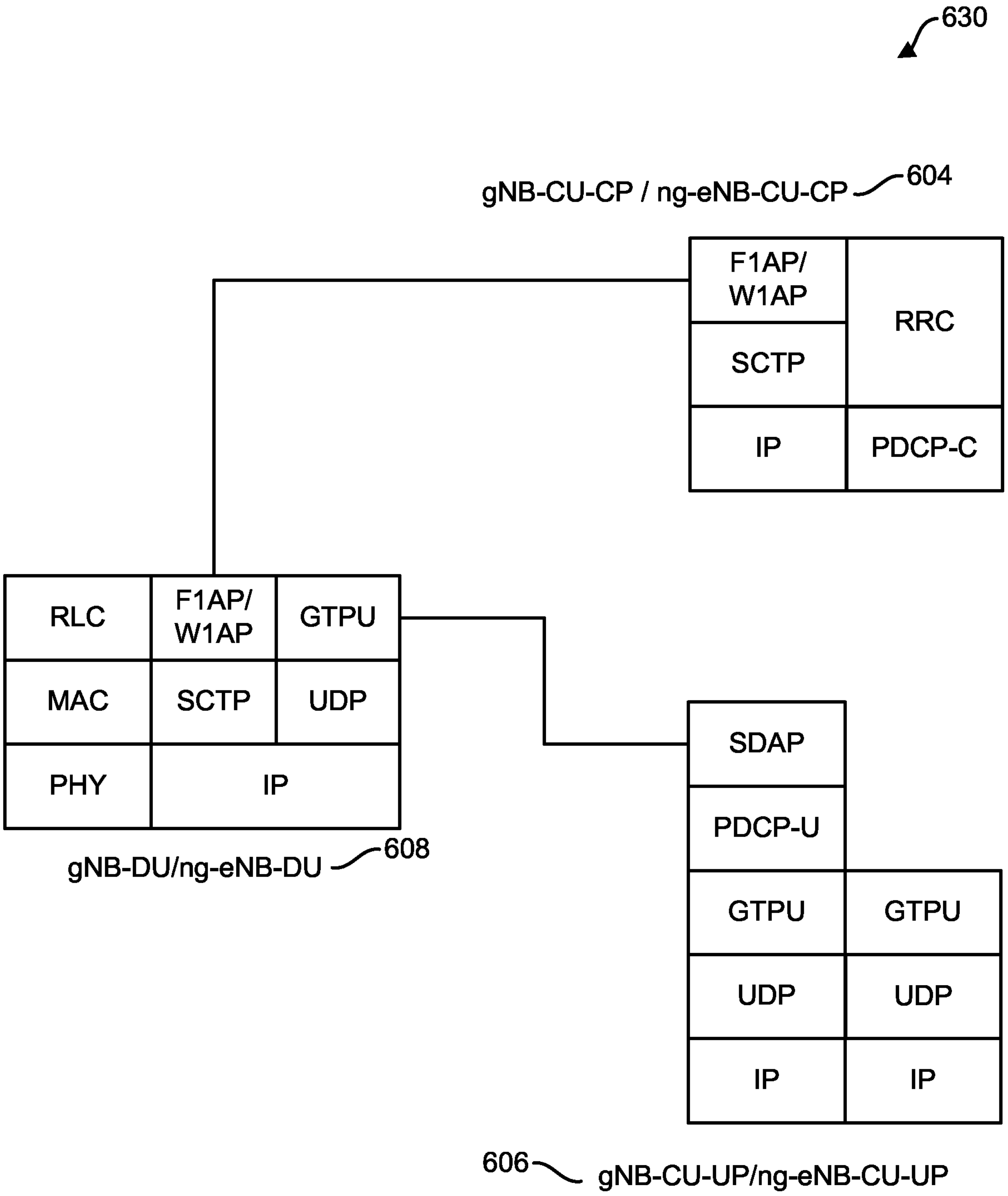
FIG. 6*b* illustrates an exemplary layer architecture of the split gNB and/or a split ng-eNB.

FIG. 6*b* illustrates an exemplary layer architecture 630 of the split gNB of FIG. 6*a*. The layer architecture 630 is configured and used similar to the layer architecture 530 of FIG. 5*b*. As shown in FIG. 6*b*, the gNB-DU 608 can be communicatively coupled to the gNB-CU-CP control plane portion 604 and the gNB-CU-UP user plane portion 606. Each of the control plane portion 604, the gNB-CU-UP user plane portion 606, and the DU 608 (and the DU 610, which is not shown in FIG. 6*b*) can be configured to include one or more layers.

As shown in FIG. 6*b*, the gNB-DU 608 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 608 may be communicatively coupled to the control plane portion 604 of the centralized unit, which may also include F1-AP, SCTP, and IP sublayers as well as radio resource control, and PDCP-control (PDCP-C) sublayers. Moreover, the distributed unit 608 (and the other DU 610) may also be communicatively coupled to the user plane portion 606 of the centralized unit of the gNB. The user plane portion 606 may include service data adaptation protocol (SDAP), PDCP-user (PDCP-U), GTPU, UDP, and IP sublayers.

Figure 6C:
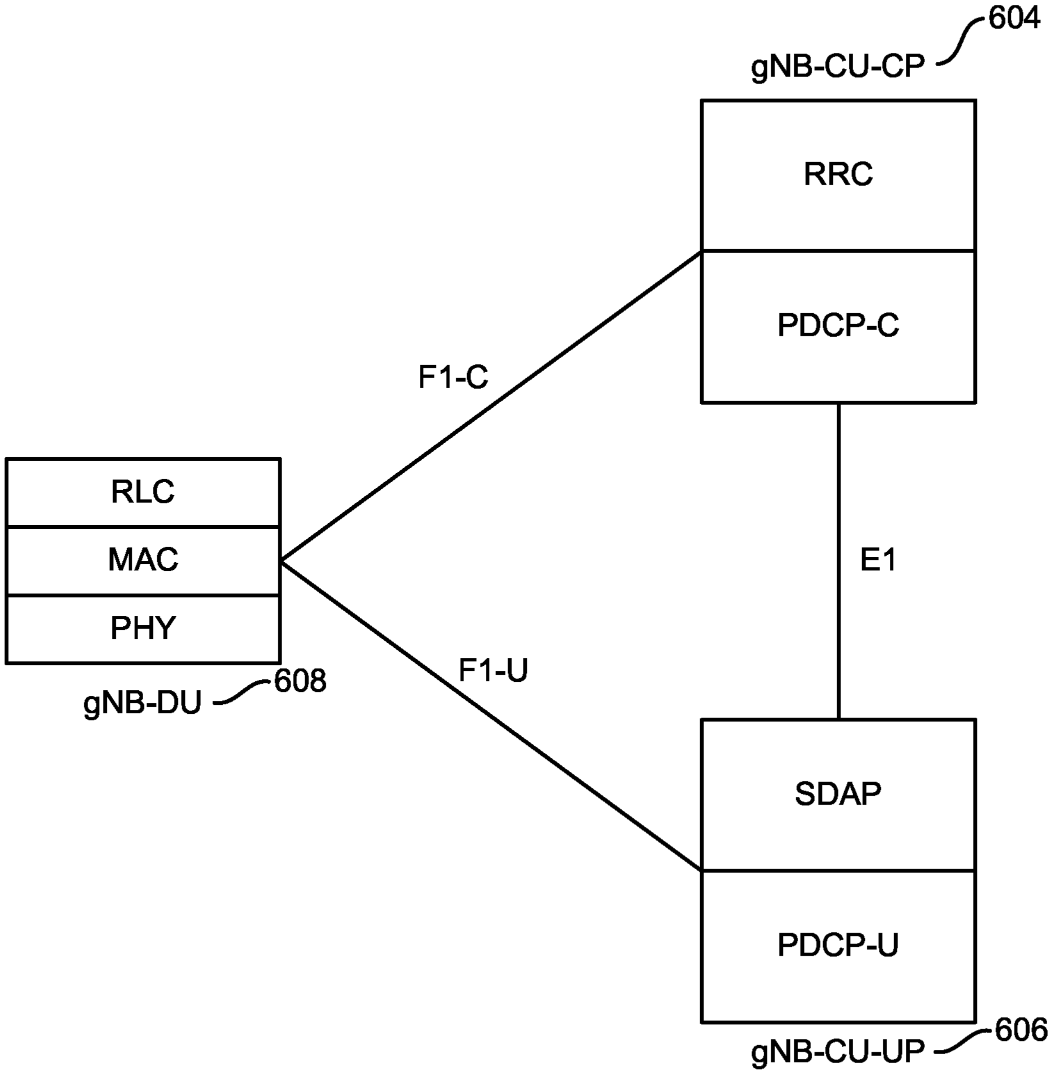
FIG. 6*c* illustrates an exemplary functional split in the gNB architecture shown in FIGS. 6*a-b;*

As shown in FIG. 6*c*, the system 600 can include a functional split that is configured and used similar to that discussed above regarding FIG. 5*c*. As shown in FIG. 6*c*, the gNB-DU 608 may be communicatively coupled to the gNB-CU-CP 604 and gNB-CU-UP 606 using an F1-C communication interface. The gNB-CU-CP 604 and the gNB-CU-UP 606 may be communicatively coupled using an E1 communication interface. The higher part of the PHY layer (or Layer 1) may be executed by the gNB-DU 608, whereas the lower parts of the PHY layer may be executed by the RUs 612 (not shown in FIG. 6*c*). As shown in FIG. 6*c*, the RRC and PDCP-C portions may be executed by the control plane portion 604, and the SDAP and PDCP-U portions may be executed by the user plane portion 606. The other DU 610, not shown in FIG. 6*c*, can be configured similar to the DU 608.

FIG. 6*b* shows stream control transmission protocol (SCTP) sublayers configured to facilitate communication in accordance with the SCTP. For example, SCTP can be used in transport layer communication, and a 3GPP application protocol (AP) using ASN. 1 encoding can be used in application layer communication. However, other protocols and/or different combinations of protocols may be used in transport layer communication, e.g., transmission control protocol (TCP), QUIC, etc., and in application layer communication, e.g., Hypertext Transfer Protocol (HTTP), a 3GPP AP using protocol buffer (protobuf) encoding, etc. For example, TCP can be used in transport layer communication, and HTTP, e.g., HTTP 1.1 or HTTP 2.0, can be used in application layer communication. For another example, TCP can be used in transport layer communication, and a 3GPP AP using protobuf encoding can be used in application layer communication. For yet another example, QUIC can be used in transport layer communication, and HTTP, e.g., HTTP 3.0, can be used in application layer communication.

Figure 6D:
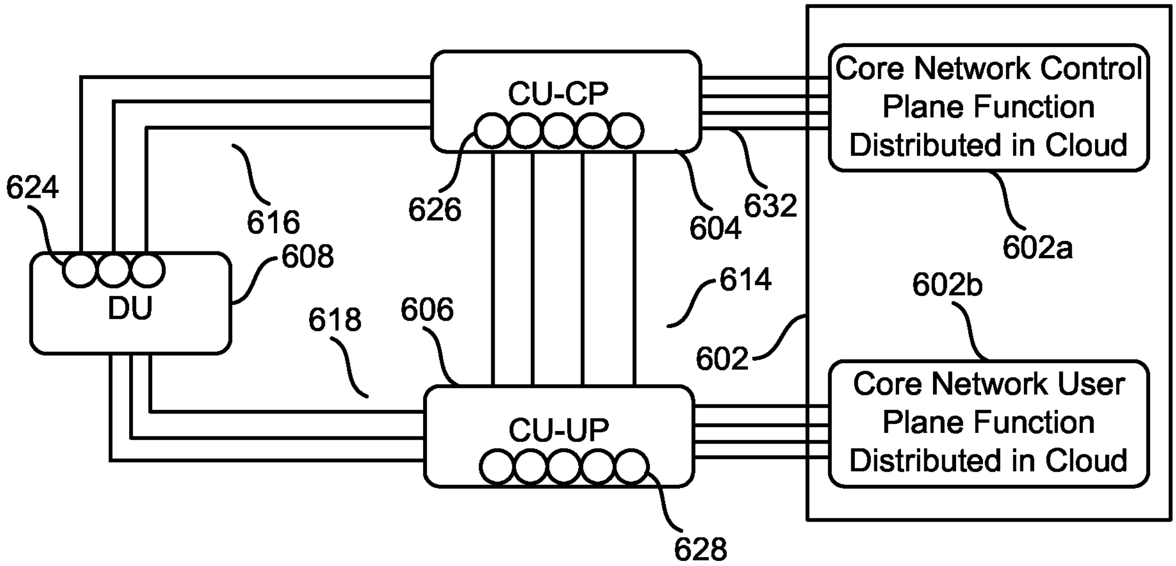
FIG. 6*d* illustrates a plurality of user equipment contexts stored in the system of FIG. 6*a;*

FIG. 6*d* illustrates a plurality of UE contexts 624 stored at the DU 608, a plurality of UE contexts 626 stored at the CU-CP 604, and a plurality of UE contexts 628 stored the CU-UP 606. Each of the UE contexts 624, 626, 628, as initiated by the core network 602 (e.g., by an access and mobility management function (AMF) 622 of the core network 602), is decoupled from the transport layer connection. A number of the UE contexts 624, 626, 628 shown in FIG. 6*d* at each of the DU 608, the CU-CP 604, and the CU-UP 606 are examples only. Other numbers of UE contexts are possible at each of the DU 608, the CU-CP 604, and the CU-UP 606. The other DU 610 (and any other DUs in the system 600) has a plurality of UE contexts stored at the DU 610, similar to the DU 608.

FIG. 6*d* also illustrates the E1 communication interface 614 between the CU-CP 604 and the CU-UP 606 as including four transport layer connections, the F1-C communication interface 616 communicatively coupling the CU-CP 604 and the DU 608 as including three transport layer connections, and the F1-U communication interface 618 communicatively coupling the CU-UP 606 and the DU 608 as including three transport layer connections. The number of each of the transport layer connections are examples only, as other numbers of each are possible.

FIG. 6*d* also illustrates the CU-CP 604 communicatively coupled with a core network control plane function 602*a* (e.g., function of the AMF 622) distributed in the cloud of the core network 602 and illustrates the CU-UP 606 communicatively coupled with a core network user plane function 602*b* distributed in the cloud of the core network 602. Four transport layer connections are shown between the core network 602 and each of the CU-CP 604 and the CU-UP 606 as examples. Another number of transport layer connections is possible.

Figure 7A:
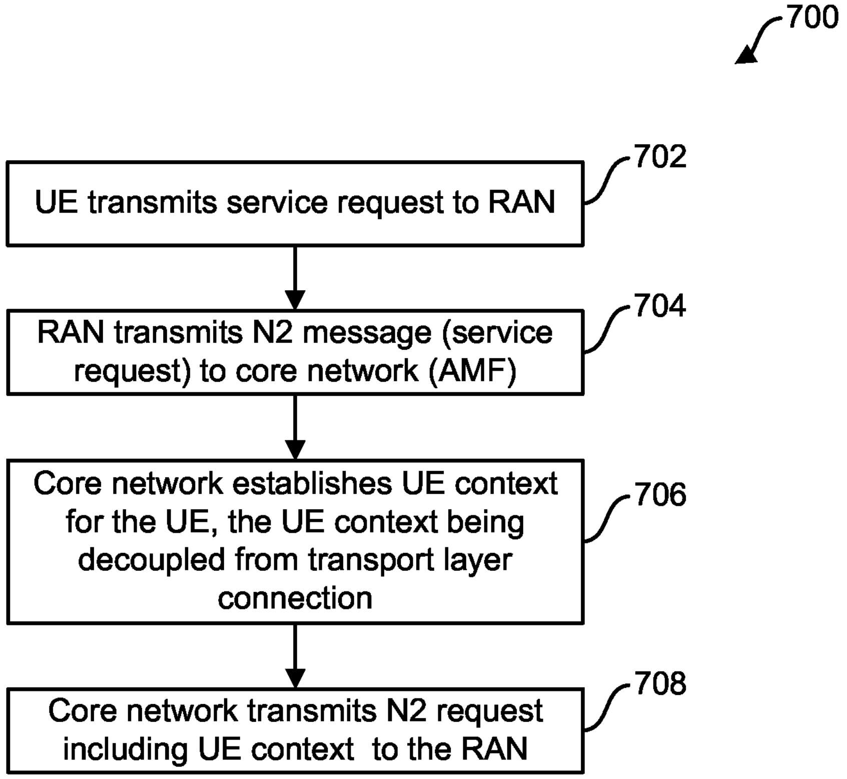
FIG. 7*a* illustrates an exemplary method, according to some implementations of the current subject matter.

FIG. 7*a* illustrates one implementation of a method 700, according to some implementations of the current subject matter. In general, the method 700 includes creating a UE context for a given UE as part of the UE's registration process with a wireless communication system, where the UE context is decoupled from a transport layer connection. The method 700 is described with respect to the implementation of the system 600 of FIGS. 6*a*-6*d* for ease of explanation but can be implemented similarly with respect to another wireless communication system.

The method 700 includes a UE transmitting 702 a service request to the RAN (e.g., the base station), e.g., to one of the RUs 612 of the RAN, that requests service on the wireless communication system. The service request can be in accordance with the service request as defined by 3GPP.

In response to receipt of the service request, the RAN, e.g., the CU-CP 604 thereof, transmits 704 an N2 message (service request) to the core network 602, e.g., to the AMF 622 of the core network 602. The N2 message (service request) can be in accordance with the N2 message (service request) as defined by 3GPP.

In response to receipt of the N2 message, the core network 602 (e.g., the AMF 622 thereof) registers the UE and establishes 706 a UE context for the given UE as part of the UE's registration process. The UE can be registered and the UE context can be established 706 as defined by 3GPP.

After the UE context has been established 706, the core network 602 transmits an N2 request to the RAN, e.g., to the CU-CP 604 thereof, including the UE context. The N2 request can be in accordance with the N2 request as defined by 3GPP. The UE context received at the base station can be stored at the DU 608 (e.g., as one of the UE contexts 624), at the CU-CP 604 (e.g., as one of the UE contexts 626), and at the CU-UP 606 (e.g., as one of the UE contexts 628). The UE may then communicate on the wireless communication system after any other actions are performed as needed in accordance with 3GPP.

In the course of the UE communicating on the wireless communication system, the transport layer connection (e.g., SCTP association, TCP association, QUIC association, etc.) specified in the UE context established 706 for the UE may fail. However, in the event of such failure, communications may continue using the established 706 decoupled UE context since the RAN is configured for cloud native deployment in which the RAN can address the UE context through any of a plurality of available transport layer connections. The failure of a transport layer connection does not release the UE context, according to some implementations of the current subject matter. A re-establishment of the failed transport connection is treated independent of the UE context. The failed transport connection may thus be repaired and, after being repaired, be re-established without affecting the previously-established 706 UE context.

Figure 7B:
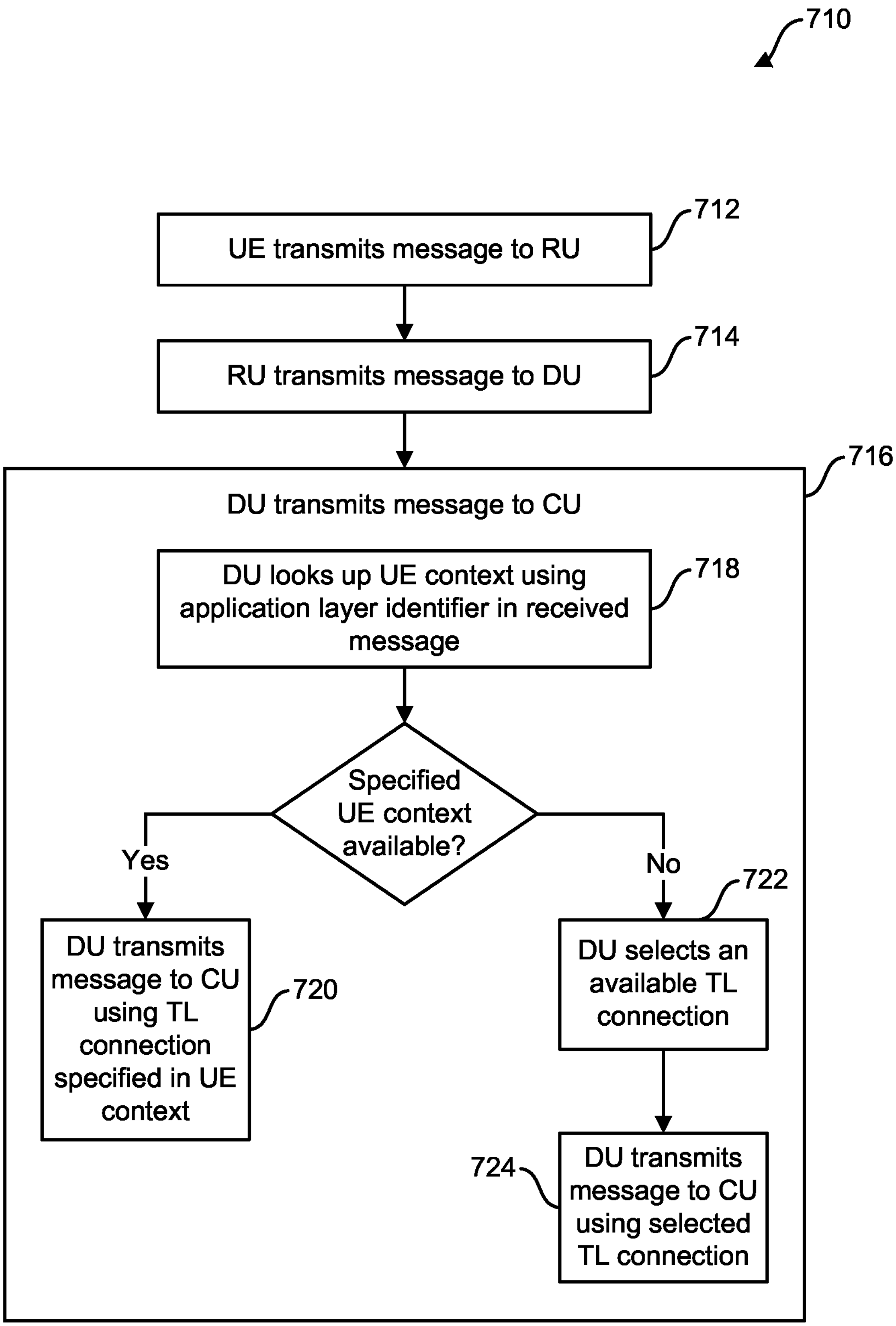
FIG. 7*b* illustrates another exemplary method, according to some implementations of the current subject matter.

FIG. 7*b* illustrates another implementation of a method 710 demonstrating that the RAN is configured for cloud native deployment, according to some implementations of the current subject matter. In general, the method 710 includes a radio access network dynamically selecting an available transport layer connection for a given UE, where the selected transport layer connection may not be specified in the given UE's UE context as created (e.g., as created in the method 700 of FIG. 7*a*). For a given UE, different messages may therefore be transmitted on different transport layer connections. The method 710 is described with respect to the method 700 of FIG. 7*a* and the implementation of the system 600 of FIGS. 6*a*-6*d* for ease of explanation but can be implemented similarly with respect to another wireless communication system. The method 710 begins after the UE context has been established 706 for the UE and the UE context has been stored at the DU 608 (and the DU 610 and any other DUs), at the CU-CP 604, and at the CU-UP 606.

The method 710 includes the UE transmitting 712 a message to the RU 612 in accordance with the UE requesting normal communication on the wireless communication network. In response to receipt of the message, the RU 612 transmits 714 a message to the DU 608 in furtherance of the UE's request for communication. In response to receipt of the message, the DU 608 transmits 716 a message to the CU using the F1 communication interface.

The transport layer used for the transmission 716 of the message from the DU 608 to the CU depends on whether the transport layer connection specified in the UE context for that particular UE is available or not. The DU 608 can look up the UE's context based solely on an application layer context identifier included in the message transmitted by the RU 612 and received by the DU 608 (and as transmitted 712, 714 by the UE and the RU 612) since the application layer context identifier will be included in the message per 3GPP. The DU 608 can look the application layer identifier up in a table correlating application layer context identifiers and UE identifiers and thereby identify the UE context associated with the UE identifier that corresponds to the application layer context identifier. The DU 608 can thus identify the transport layer connection specified in the UE context. The content of the application layer context identifier may differ depending on the protocol using in application layer communication. For example, an application layer context identifier in HTTP can include a URL or a portion thereof.

If the transport layer connection specified in the UE context is available, the DU 608 transmits 720 the message using the transport layer connection specified in the UE's UE context. If the transport layer connection specified in the UE context is not available, e.g., because the transport layer connection has failed, the DU 608 selects 722 an available transport layer connection from among possible F1 transport layer connections between the DU 608 and the CU. Using FIG. 6*d* by way of example, the DU 608 can select 722 an available transport layer connection from among the other two possible F1 transport layer connections between the DU 608 and the CU.

In some implementations, the DU 608 selects 722 the available transport layer connection at random from among the possible F1 transport layer connections. A randomized selection may be relatively simple to implement and may use a relatively low amount of processing power.

In some implementations, the DU 608 selects 722 the available transport layer connection based on a predetermined selection order of the plurality of available transport layer connections. The predetermined selection order can be preprogrammed at the DU 608. Following a predetermined selection order may be relatively simple to implement, may use a relatively low amount of processing power, and may provide for improved load balancing as compared to random selection since transport layer connections are each selected in turn as defined by the predetermined selection order.

In some implementations, the DU 608 selects 722 the available transport layer connection based on a load balancing of the plurality of available transport layer connections. In such a load balancing approach, the DU 608 can determine which one of the available transport layer connections has a lowest number of messages being transmitted thereon and select 722 that one of transport layer connections. In accordance with 3GPP, the DU 608 will have knowledge of a number of messages being transmitted on the various transport layer connections. Using a load balanced approach may allow for a most efficient use of the transport layer connections.

After the selection 722 of the available transport layer connection, e.g., by random selection, by using a predetermined selection order, or by using a load balancing approach, the DU 708 transmits 724 the message to the CU using the selected 722 transport layer connection. Communications on the F1 interface may therefore be possible with respect to a given UE even if the transport layer connection specified in that UE's UE context is unavailable.

The CU-CP 604 and the CU-UP 606 can select an available transport layer connection from among the possible E1 transport layer connections 614 similar to that discussed above regarding the DU 608 selecting an available transport layer connection for F1 communication. Communications on the E1 interface may therefore be possible with respect to a given UE even if the transport layer connection specified in that UE's UE context is unavailable.

Similarly, the CU-CP 604 can select an available transport layer connection from among the available ones of NG (N2) transport layer connections 632 similar to that discussed above regarding the DU 608. Communications on the NG (N2) interface may therefore be possible with respect to a given UE even if the transport layer connection specified in that UE's context is unavailable.

Figure 8:
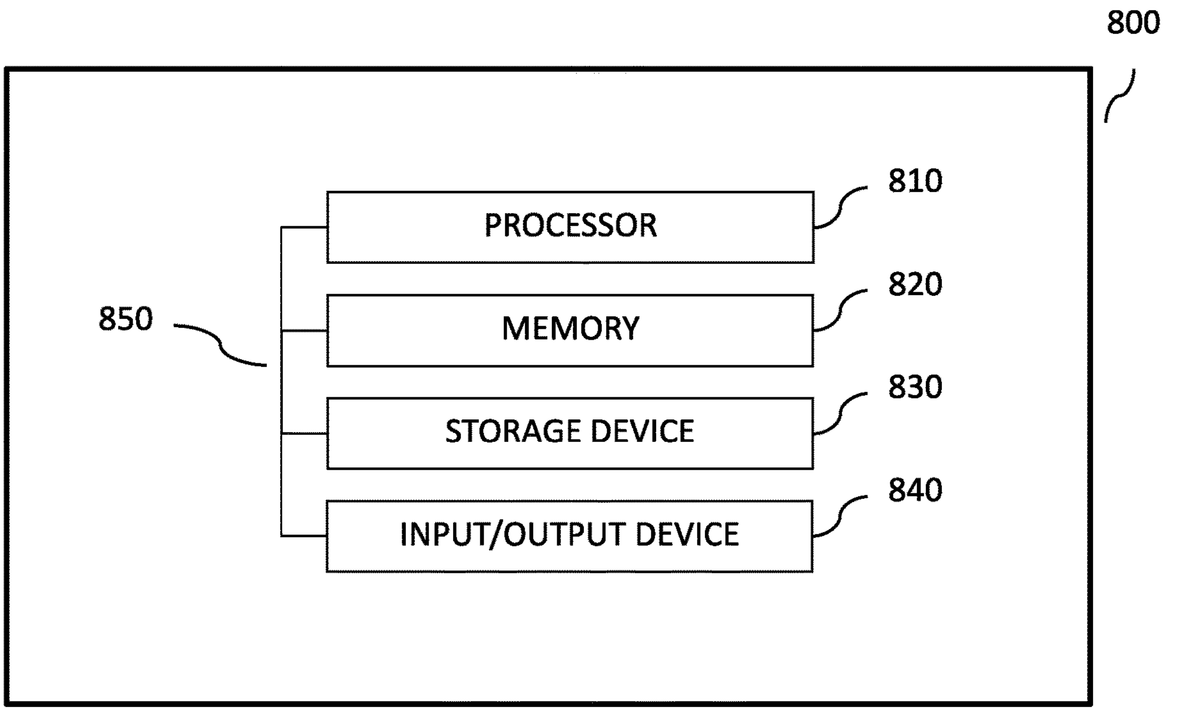
FIG. 8 illustrates an exemplary system, according to some implementations of the current subject matter.

In some implementations, the current subject matter can be configured to be implemented in a system 800, as shown in FIG. 8. The system 800 can include one or more of a processor 810, a memory 820, a storage device 830, and an input/output device 840. Each of the components 810, 820, 830 and 840 can be interconnected using a system bus 850. The processor 810 can be configured to process instructions for execution within the system 600. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

Figure 9:
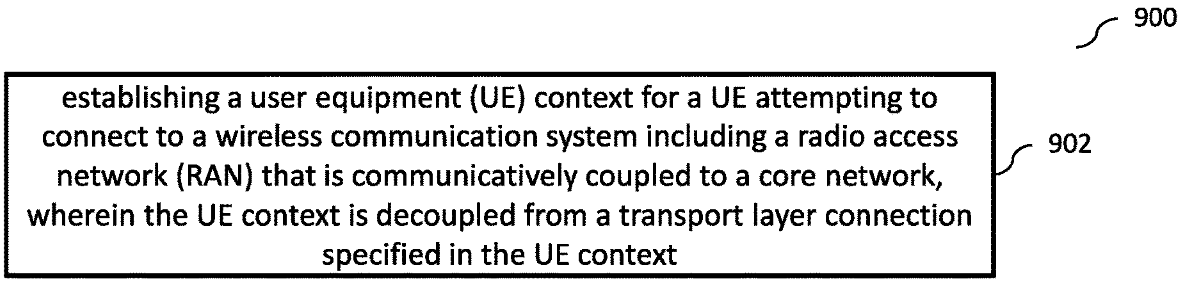
FIG. 9 illustrates another exemplary method, according to some implementations of the current subject matter.

FIG. 9 illustrates an exemplary method 900 for cloud native scalable radio access networks, according to some implementations of the current subject matter. The method 900 may be performed, for example, using implementations shown in and described with respect to FIGS. 6-7*b*.

The method 900 includes establishing 902 a UE context (e.g., UE contexts 624, 626, 628 of FIG. 6*d*, etc.) for a UE attempting to connect to a wireless communication system including a RAN (e.g., the RAN of FIG. 6*a*, etc.) that is communicatively coupled to a core network (e.g., the core network 602 of FIG. 6*a*, etc.). The UE context is decoupled from a transport layer connection specified in the UE context.

In some implementations, the current subject matter can include one or more of the following optional features.

In some implementations, the RAN can be configured to address the UE context through any of a plurality of available transport layer connections. Further, the RAN can be configured to select one of the plurality of available transport layer connections for addressing the decoupled UE context. Further, the RAN can be configured to randomly select the one of the plurality of available transport layer connections, the RAN can be configured to select, based on a load balancing of the plurality of available transport layer connections, the one of the plurality of available transport layer connections, or the RAN can be configured to select, based on a predetermined selection order of the plurality of available transport layer connections, the one of the plurality of available transport layer connections.

In some implementations, a failure of the transport layer connection can not release the UE context. Further, a re-establishment of the failed transport connection can be treated independent of the UE context.

In some implementations, the RAN can be configured to look up the UE context basely solely on an application layer context identifier.

In some implementations, the method can further include, after establishing the UE context, communicating between the RAN and the core network.

In some implementations, the method can further include, after establishing the UE context, communicating between a distributed unit (DU) of the RAN and at least one of a control plane portion of a centralized unit (CU) of the RAN and a user plane portion of the CU using a RAN-selected available one of a plurality of available transport layer connections between the DU and the at least one of the control plane portion and the user plane portion.

In some implementations, the method can further include, after establishing the UE context, communicating between a control plane portion of a centralized unit (CU) of the RAN and a user plane portion of the CU using a RAN-selected available one of a plurality of available transport layer connections between the control plane portion and the user plane portion.

In some implementations, the RAN can use a protocol for transport layer communication for a control plane that includes one of the following: stream control transmission protocol (SCTP), transmission control protocol (TCP), and QUIC.

In some implementations, the RAN can use a protocol for transport layer communication for a user plane that includes user datagram protocol (UDP).

In some implementations, the RAN can include a base station that is communicatively coupled to the core network.

In some implementations, the core network can establish the UE context.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term “user” can refer to any entity including a person or a computer.

Although ordinal numbers such as first, second, and the like can, in some situations, relate to an order: as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term “machine-readable medium” refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term “machine-readable signal” refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback: and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network (“LAN”), a wide area network (“WAN”), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:

establishing a user equipment (UE) context for a UE attempting to connect to a wireless communication system including a radio access network (RAN) that is communicatively coupled to a core network, wherein the UE context is decoupled from a transport layer connection specified in the UE context, wherein the RAN is configured to select one of a plurality of available transport layer connections for addressing the decoupled UE context, based on a determination that the specified transport layer connection is not available, and wherein the specified transport layer connection and the plurality of available transport layer connections are between at least one of:

a Distributed Unit (DU) and a Centralized Unit (CU); and the CU and a core network.

2. The method of claim 1, wherein the RAN is configured to address the UE context through any of a plurality of available transport layer connections.

3. The method of claim 1, wherein the RAN is configured to randomly select the one of the plurality of available transport layer connections.

4. The method of claim 1, wherein the RAN is configured to select, based on a load balancing of the plurality of available transport layer connections, the one of the plurality of available transport layer connections.

5. The method of claim 1, wherein the RAN is configured to select, based on a predetermined selection order of the plurality of available transport layer connections, the one of the plurality of available transport layer connections.

6. The method of claim 1, wherein a failure of the transport layer connection does not release the UE context.

7. The method of claim 6, wherein a re-establishment of the failed transport connection is treated independent of the UE context.

8. The method of claim 1, wherein the RAN is configured to look up the UE context basely solely on an application layer context identifier.

9. The method of claim 1, further comprising, after establishing the UE context, communicating between the RAN and the core network.

10. The method of claim 1, further comprising, after establishing the UE context, communicating between a distributed unit (DU) of the RAN and at least one of a control plane portion of a centralized unit (CU) of the RAN and a user plane portion of the CU using a RAN-selected available one of a plurality of available transport layer connections between the DU and the at least one of the control plane portion and the user plane portion.

11. The method of claim 1, further comprising, after establishing the UE context, communicating between a control plane portion of a centralized unit (CU) of the RAN and a user plane portion of the CU using a RAN-selected available one of a plurality of available transport layer connections between the control plane portion and the user plane portion.

12. The method of claim 1, wherein the RAN uses a protocol for transport layer communication for a control plane that includes one of the following: stream control transmission protocol (SCTP), transmission control protocol (TCP), and QUIC.

13. The method of claim 1, wherein the RAN uses a protocol for transport layer communication for a user plane that includes user datagram protocol (UDP).

14. The method of claim 1, wherein the RAN includes a base station that is communicatively coupled to the core network.

15. The method of claim 1, wherein the core network establishes the UE context.

16. The method of claim 1, wherein the UE context is established by a core network node.

17. An apparatus, comprising:

at least one processor, and at least one non-transitory storage media storing instructions that, when executed by the at least one processor, cause the at least one processor to perform operations comprising:

establishing a user equipment (UE) context for a UE attempting to connect to a wireless communication system including a radio access network (RAN) that is communicatively coupled to a core network, wherein the UE context is decoupled from a transport layer connection specified in the UE context, wherein the RAN is configured to select one of a plurality of available transport layer connections for addressing the decoupled UE context, based on a determination that the specified transport layer connection is not available, and wherein the specified transport layer connection and the plurality of available transport layer connections are between at least one of:

a Distributed Unit (DU) and a Centralized Unit (CU); and the CU and a core network.

18. At least one non-transitory storage media storing instructions that, when executed by at least one processor, cause the at least one processor to perform operations comprising:

establishing a user equipment (UE) context for a UE attempting to connect to a wireless communication system including a radio access network (RAN) that is communicatively coupled to a core network, wherein the UE context is decoupled from a transport layer connection specified in the UE context, wherein the RAN is configured to select one of a plurality of available transport layer connections for addressing the decoupled UE context, based on a determination that the specified transport layer connection is not available, and wherein the specified transport layer connection and the plurality of available transport layer connections are between at least one of:

a Distributed Unit (DU) and a Centralized Unit (CU); and the CU and a core network.

* * * * *